UNITED STATES PATENT OFFICE.

EMILE HERZKA, OF ARECIBO, PORTO RICO.

PROCESS OF MANUFACTURING FERTILIZER OUT OF STEFFENS WASTE WATER, &c.

1,212,484.           Specification of Letters Patent.     Patented Jan. 16, 1917.

No Drawing.       Application filed October 24, 1916. Serial No. 127,352.

*To all whom it may concern:*

Be it known that I, EMILE HERZKA, a subject of the Emperor of Austria-Hungary, residing at Arecibo, in the district of Arecibo and island of Porto Rico, have invented new and useful improvements in processes of manufacturing fertilizer out of Steffens waste water, osmosis-water, and other similar waste waters resulting in the process of extracting sugar from beet-sugar molasses, of which the following is a specification.

The invention consists in concentrating the waste waters to 55° Brix, in acidifying same with sulfuric acid, mixing with calcium superphosphate and sawdust and subjecting the mixture to a drying process; and has for its object the production of a stable and more efficacious fertilizer.

The Steffens waste water, the osmosis water, and the other similar waste waters resulting in the process of extracting sugar from beet sugar molasses are concentrated to 55° Brix and are treated with the quantity of sulfuric acid chemically equivalent to the lime and alkaline content of the waste waters. Then are added superphosphate of calcium varying in quantity according to the amount desired in the finished fertilizer and sawdust to the amount of 10% of the mass.

The purpose of treating with the sulfuric acid is to convert the lime and alkaline compounds into the corresponding sulfates whereby the potash is obtained in the form most utilizable for fertilizer.

The purpose of adding the sawdust is to secure a uniform mass in the drying process.

Before the drying it is also feasible to add nitrogen-containing animal wastes whereby the nitrogen content of the fertilizer is raised.

I claim:

1. The process of manufacturing fertilizer out of Steffens waste water, osmosis water, and other similar waste waters resulting in the process of extracting sugar from beet sugar molasses consisting in concentrating the above mentioned waste waters to 55° Brix, and acidifying same with the quantity of sulfuric acid chemically equivalent to the lime and alkaline content of the waste waters, and adding calcium superphosphate and sawdust, and subjecting the mixture to a drying process.

2. The process of manufacturing fertilizer out of Steffens waste water, osmosis water, and other similar waste waters resulting in the process of extracting sugar from beet sugar molasses consisting in concentrating the above mentioned waste waters to 55° Brix, and acidifying same with the quantity of sulfuric acid chemically equivalent to the lime and alkaline content of the waste waters and adding calcium superphosphate and nitrogen-containing animal wastes and sawdust and subjecting the mixture to a drying process.

EMILE HERZKA.

Witnesses:
    MAURICE H. ESSER,
    NELSON R. PARK.